United States Patent [19]

Wonn

[11] 4,360,090
[45] Nov. 23, 1982

[54] TORQUE REVERSAL CONTROL VALVE FOR A TORQUE CONVERTER CLUTCH

[75] Inventor: Quinby E. Wonn, Farmington, Mich.

[73] Assignee: General Motors Corporation, Detroit, Mich.

[21] Appl. No.: 199,085

[22] Filed: Oct. 20, 1980

[51] Int. Cl.³ .................. F16D 39/00; F16H 45/02
[52] U.S. Cl. .................................................. 192/3.3
[58] Field of Search ............. 192/3.3, 3.31, 3.28, 192/3.29, 56 F; 74/731, 732

[56] References Cited

U.S. PATENT DOCUMENTS

| | | | |
|---|---|---|---|
| 3,734,251 | 5/1973 | Annis et al. | 192/3.3 |
| 3,966,031 | 6/1976 | Peterson et al. | 192/3.3 |
| 4,167,993 | 9/1979 | Vukovich et al. | 192/3.3 |
| 4,169,526 | 10/1979 | Malloy | 192/3.3 |

Primary Examiner—George H. Krizmanich
Attorney, Agent, or Firm—Donald F. Scherer

[57] ABSTRACT

A torque converter clutch has a normally closed valve member disposed on the clutch pressure plate. During normal forward (engine to transmission) torque transmission, the valve remains closed. Upon torque reversal (transmission to engine), the vibration damper associated with the clutch engages and opens the valve member so that a reduction in clutch apply pressure occurs resulting in clutch disengagement.

3 Claims, 4 Drawing Figures

TORQUE REVERSAL CONTROL VALVE FOR A TORQUE CONVERTER CLUTCH

This invention relates to controls for torque converter clutches and more particularly to controls which disengage the clutch during torque reversal through the torque converter.

It is an object of this invention to provide an improved control valve for a torque converter clutch which will reduce the clutch engagement pressure upon the occurrence of a reversal of torque transmission.

It is another object of this invention to provide an improved control valve for a torque converter clutch which is selectively engageable between the input and output members of a torque converter and includes a torsional vibration damper wherein the control valve member is disposed on the clutch pressure plate and is engageable by a portion of the vibration damper during torque reversal to connect the clutch apply chamber to a low pressure area thereby disengaging the clutch.

These and other objects and advantages of the present invention will be more apparent from the following description and drawings in which.

Figure 1:
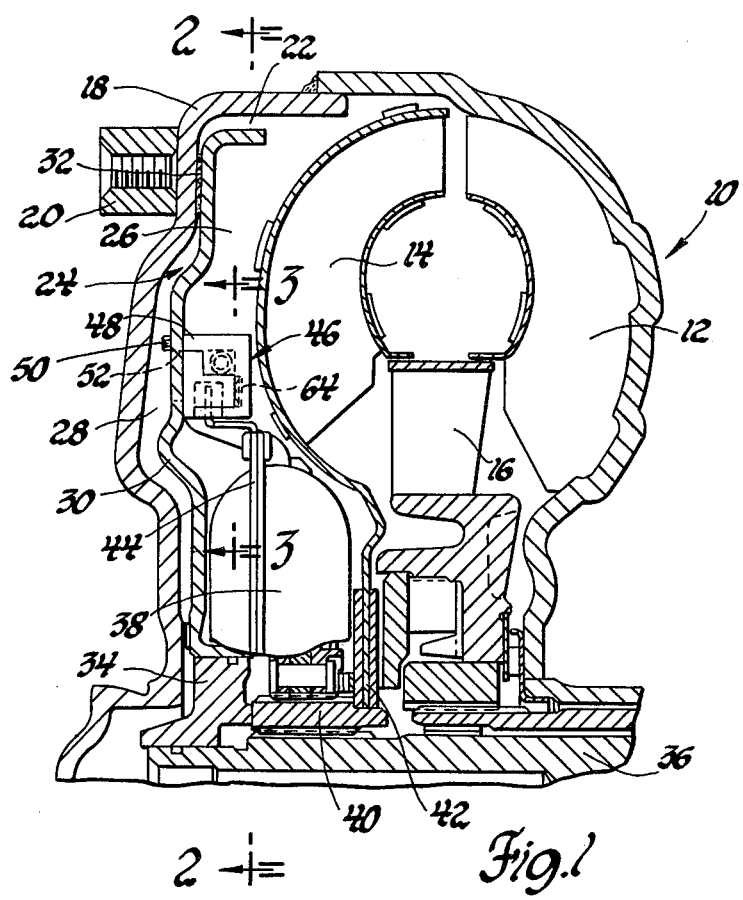
FIG. 1 is a cross-sectional elevational view of a torque converter and clutch assembly incorporating a control valve.

Referring to the drawings, wherein like characters represent the same or corresponding parts throughout the several views, there is seen in FIG. 1 a conventional torque converter 10, having an impeller 12, a turbine 14 and a stator 16 arranged in a conventional toroidal flow relationship. The impeller 12 is welded to an input shell 18 which has a plurality of connecting lugs 20 adapted to be connected to an engine flywheel. A fluid space 22 is formed between the turbine 14 and the input shell 18. A friction clutch member 24 is disposed in the space 22 and separates the space 22 into a clutch engagement chamber 26 and a clutch disengagement chamber 28.

The clutch 24 includes a pressure plate 30 which has bonded thereto a conventional friction surface 32. The pressure plate 30 is slidably disposed on a spacer 34 which is mounted on a torque converter output shaft 36. The clutch 24 also includes a vibration damper 38 disposed in driving relationship between the pressure plate 30 and a hub 40 which is splined to the shaft 36. The hub 40 is also welded to a turbine hub 42 which is integral with the turbine 14.

The clutch 24 is preferably selectively engaged and disengaged by flow reversal to the torque converter in a manner similar to that disclosed in U.S. Pat. No. 3,252,352 issued to General et al. May 24, 1966. When it is desirable to engage the clutch 24, the torque converter 10 is supplied with fluid in a normal manner such that the fluid pressure in the engagement chamber 26 will be higher than the fluid pressure in the disengagement chamber 28 resulting in clutch engagement.

When it is desirable to disengage the clutch 24, fluid pressure is supplied to the disengagement chamber 28 such that the pressure plate 30 is moved axially so that the friction surface 32 will not contact the input shell 18. Fluid delivered to the disengagement chamber 28 passes between the pressure plate and input shell 18 and enters the torque converter at the outer periphery between the impeller 12 and the turbine 14.

The vibration damper 38 is operable in a well-known manner to lessen the transmission of torsional vibrations which might otherwise be delivered to the shaft 36. The vibration damper 38 is preferably a series type vibration damper such that high angular travel between the pressure plate 30 and the hub 40 can be obtained. The vibration damper 38 includes a spring housing or equalizer member 44 which has angular movement relative to both the input (pressure plate 30) and output (hub 40) of the damper during operation.

It is desirable to disengage the clutch 24 upon torque reversal through the torque converter 10. During normal driving operation, that is when the engine is supplying power to drive the vehicle, it is desirable to have the clutch 24 engaged so that improved efficiency is obtained. When the operator releases the throttle pedal and the vehicle goes into a coast condition, it is desirable to disengage the clutch so that the engine can decelerate without a noticeable torque spike being transmitted. While the clutch would normally be disengaged by pressurizing chamber 28, the flow change necessary is not always sufficiently rapid to prevent the noticeable torque spike.

Figure 3:
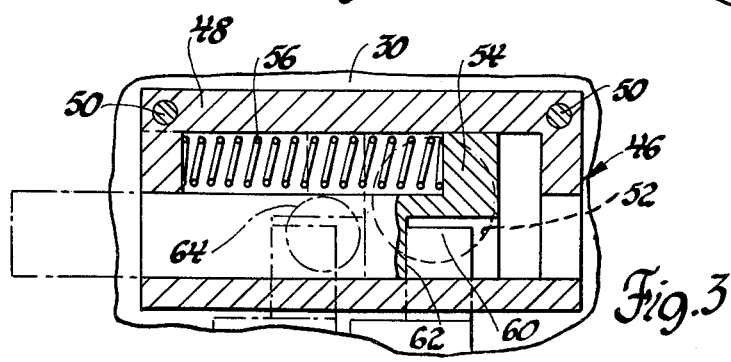
FIG. 3 is a sectional view taken along line 3—3 of FIG. 1.
Figure 4:
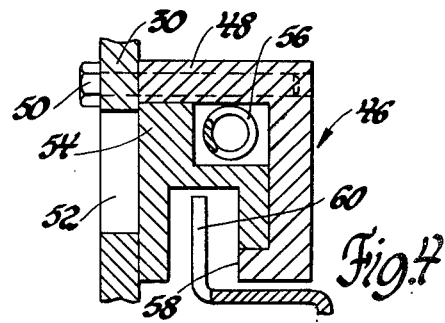
FIG. 4 is a sectional view taken along line 4—4 of FIG. 2.

To accomplish more rapid disengagement of the clutch 24, a torque reversal valve 46 is disposed on the pressure plate 30. The torque reversal valve 46 includes a housing 48 which is secured to the pressure plate 30 by a plurality of fasteners 50. The housing 48 covers an opening or aperture 52 formed in the pressure plate 30. A slidable valve element or member 54 is disposed in the housing 48 and is urged rightward, as viewed in FIG. 3, by a compression spring 56. In the normal spring set condition, the valve element 54 covers the aperture 52 thereby preventing fluid communication between chambers 26 and 28.

The housing 48 has an opening 58 through which an actuator tab 60 extends. The actuator tab 60 is secured to the equalizer 44 of the vibration damper 38. The actuator 60 is aligned to engage a shoulder 62 formed on the slide valve member 54. The valve member 54 is urged against the pressure plate 30 by a spring washer 64 to aid the sealing of aperture 52.

Figure 2:
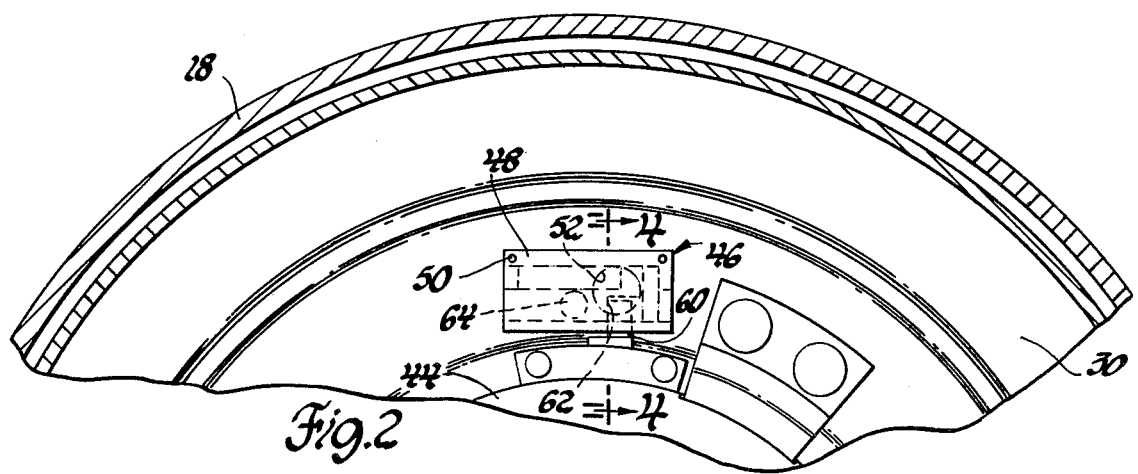
FIG. 2 is a view partly in section taken along line 2—2 of FIG. 1.

During normal or forward torque transmission, the actuator tab 60 moves clockwise relative to the pressure plate 30 as viewed in FIG. 2. Due to the clockwise movement relative to pressure plate 30, the actuator tab 60 is out of engagement with the shoulder 62 such that the valve element 54 will maintain the aperture 52 closed. Upon torque reversal, such as during vehicle coast, the equalizer 44 and therefore actuator tab 60 will move counterclockwise relative to the pressure plate 30. During the counterclockwise movement, the tab 60 will force the valve 54 to move against the spring 56 thereby opening the aperture 52. Upon opening of the aperture 52, the fluid pressure in engagement chamber 26 will be reduced by permitting fluid flow to the then low pressure chamber 28. This fluid flow will reduce the pressure differential between chambers 26 and 28 sufficiently so that the clutch 24 will be disengaged or placed in slipping engagement. This will eliminate the transmission of a torsional spike which might otherwise occur and be undesirable to the vehicle operator.

If desirable, the valve member 54 could also be actuated by a connection with the shaft 36, hub 40 or the turbine 14. The valve 54 could also be actuated by the output hub of the vibration damper 38. In order to achieve good dynamic balancing, it is preferable to utilize two valve assemblies which would be diametrically opposed. However, a single valve member and a diametrically opposed balancing mass could be utilized.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A torque reversal control valve for a torque converter clutch, said torque converter clutch including a fluid pressure chamber, a pressure plate disposed in said pressure chamber and being selectively engageable with a torque converter input member, and a vibration damper means for resiliently connecting said pressure plate with a torque converter output member; said torque converter clutch being operable in response to fluid pressure in said pressure chamber to transmit torque; said control valve comprising a body portion secured to said pressure plate, an aperture in said pressure plate, a slide member disposed in said body portion, resilient means for urging said slide member to close said aperture and actuator means operatively connected with said slide member and being contacted by said damper means upon a change in the direction of torque transmission by said torque converter clutch to move said slide member to open said aperture to effect a reduction in the fluid pressure in said pressure chamber for thereby reducing the torque capacity of said torque converter clutch.

2. A torque reversal control valve for a torque converter clutch, said torque converter clutch including a fluid pressure chamber, a pressure plate disposed in said pressure chamber and being selectively engageable with a torque converter input member, and a vibrator damper means for resiliently connecting said pressure plate with a torque converter output member; said torque converter clutch being operable in response to fluid pressure in said pressure chamber to transmit torque; said control valve comprising a body portion secured to said pressure plate, an aperture in said pressure plate, a valve member disposed in said body portion adjacent said aperture, resilient means for urging said valve member to close said aperture and actuator means operatively connected with said valve member and being contacted by said damper means upon a change in the direction of torque transmission through said torque converter clutch to move said valve member to open said aperture to effect a reduction in the fluid pressure in said pressure chamber for thereby reducing the torque capacity of said torque converter clutch.

3. A torque reversal control valve for a torque converter clutch, said torque converter clutch including an engagement chamber and a disengagement chamber, a pressure plate disposed between said chambers and being selectively engageable with a torque converter input member, and a damper means for resiliently connecting said pressure plate with a torque converter output member; said torque converter clutch being operable in response to a pressure differential between said chambers to transmit torque; said control valve comprising a valve member operatively connected to said pressure plate, an aperture in said pressure plate, resilient means for urging said valve member to close said aperture and actuator means operatively connected with said damper means for selectively contacting said valve member upon a change in the direction of torque transmission through said torque converter clutch to operate said valve member to open said aperture to effect a flow connection between said chambers to reduce the pressure differential therebetween thereby reducing the torque capacity of said torque converter clutch.

* * * * *